Sept. 22, 1925.
J. T. HARRISON
SERVICE TABLE
Filed Jan. 13, 1923
1,554,578
2 Sheets-Sheet 1
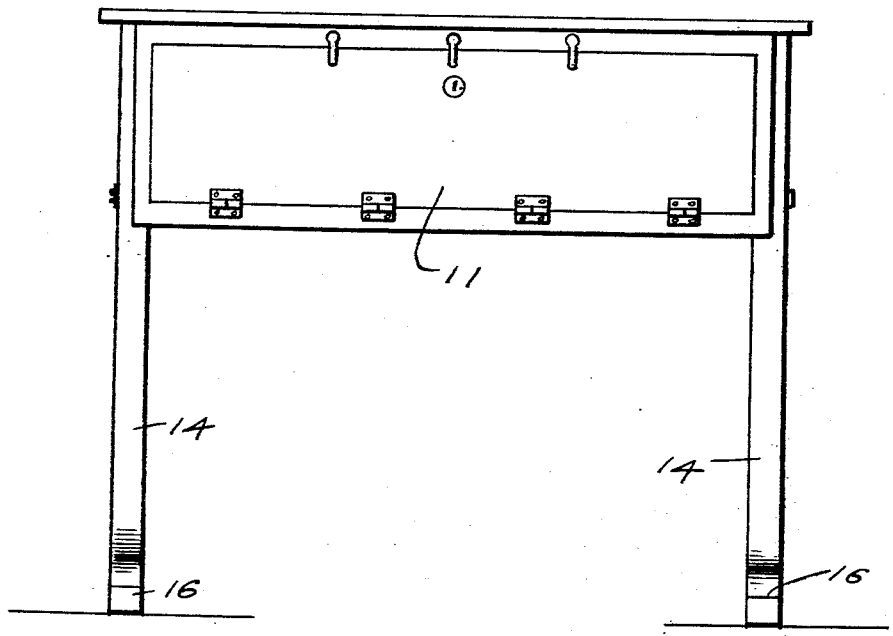
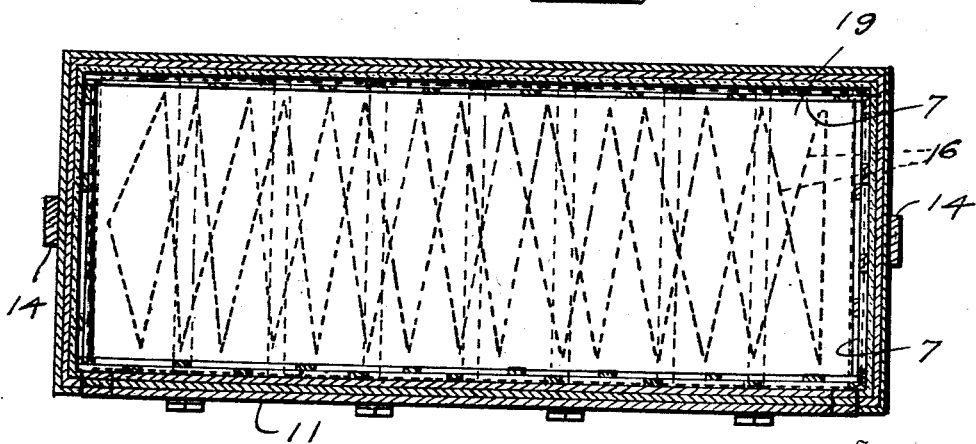
Inventor
J.T.Harrison.
By William J. Jacobi
Attorney Sept. 22, 1925.
J. T. HARRISON
SERVICE TABLE
Filed Jan. 13, 1923
1,554,578
2 Sheets-Sheet 2
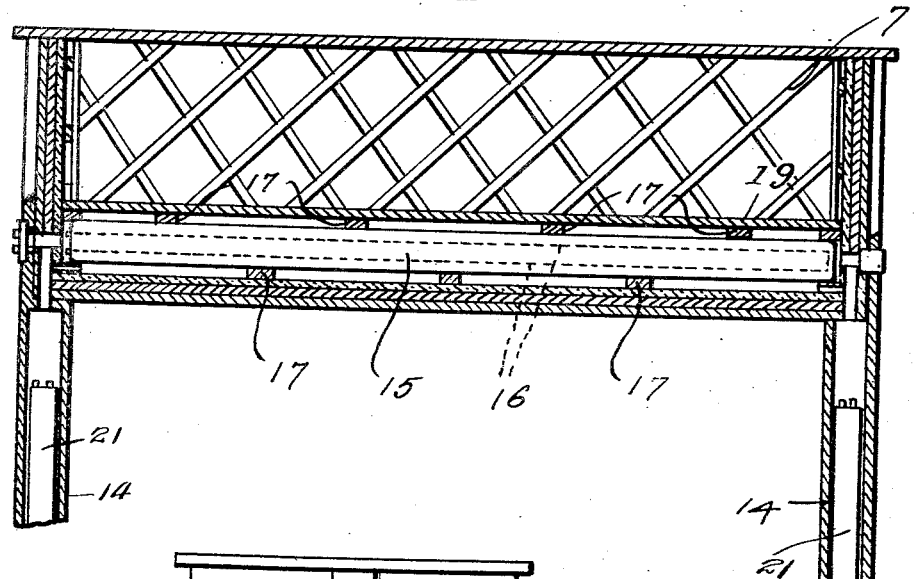
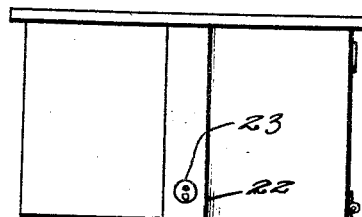
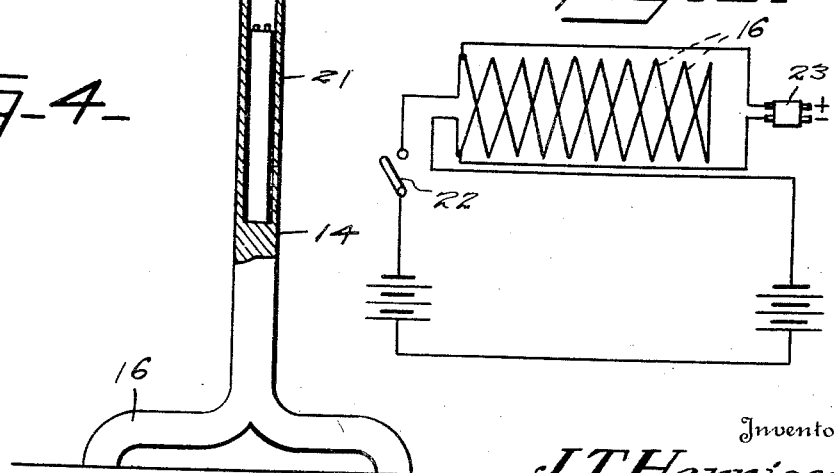
Inventor
J. T. Harrison
By William J. Jacobi
Attorney Patented Sept. 22, 1925.

1,554,578

UNITED STATES PATENT OFFICE.

JOHN T. HARRISON, OF ASBURY PARK, NEW JERSEY.

SERVICE TABLE.

Application filed January 13, 1923. Serial No. 612,403.

*To all whom it may concern:*

Be it known that JOHN T. HARRISON, a citizen of the United States, residing at Asbury Park, in the county of Monmouth and State of New Jersey, has invented certain new and useful Improvements in Service Tables, of which the following is a specification.

My invention is an electrically heated service table and its principal object is to provide a table of this character adapted to retain food in a heated condition preparatory to placing the same on the dining table.

A further object of the invention is to provide a portable electrically heated service table adapted to be carried from the kitchen to the dining room and retain the food in a heated condition until the same is ready to be placed on the dining table.

Further the invention contemplates a table of this character which is neat, light in weight, durable in use and will retain the heat so that a maximum amount of heat will be transmitted to the food supported on the table.

With the preceding and other objects and advantages in mind, the invention consists in the novel combination of elements, constructions and arrangement of parts and operations to be hereinafter specifically referred to, claimed and illustrated in the accompanying drawing wherein—

Figure 1 is a side elevation of a service table constructed in accordance with my invention.

Figure 2 is a vertical sectional view of the table.

Figure 3 is a transverse sectional view of the same.

Figure 4 is an end elevation of the table.

Figure 5 is a diagrammatic view of the heating element and electrical circuit embodied in the invention.

My improved table comprises a rectangular casing which includes an outer wall or layer of cork, an intermediate layer of asbestos, and an inner facing of mica. The layers of cork and asbestos will retain the heat in the casing to a maximum degree and at the same time will render the casing very light so as to permit the device to be readily handled. A sheet metal lattice work indicated at 7 extends over the mica facing to retain the same in place and to reinforce the structure generally. A table top is secured to the upper edges of the casing and a hinged door 11 is provided in the forward part of the casing.

Legs 14 are connected with the opposite ends of the casing and terminated in lateral extending feet 16 at its lower end. In connection with the legs and casing I wish to emphasize the fact that they are very light and are such as to permit the table to be carried with the food therein in the same manner as a serving tray.

Arranged in the bottom of the casing is a porcelain slab or base 15 in which heating elements 16 are arranged. Spacer blocks 17 extend from the upper and lower faces of this slab, the bottom one of which serves to space the slab from the bottom of the casing while the upper spacers or blocks support an aluminum shelf 19. Conductors 20 lead from the ends of the slab and connected therewith are storage batteries 21 supported on the legs of the table. A switch 22 is provided for controlling the heaters while a socket 23 is provided whereby the heater may be connected with house currents if desired.

From the disclosure it will be seen that I have provided a simple and inexpensive serving table of this character wherein the food contained therein will be retained in a heated condition until the same is ready to be eaten. Also the device is light and durable so that the same may be readily carried from one person to another, one room to another with the food therein.

From the foregoing it will be seen that I have provided a simple, inexpensive and efficient means for carrying out the objects of the invention, and while I have particularly described the means best adapted to perform the functions set forth, various changes in form, proportion and in the minor details of construction may be resorted to without departing from the spirit or sacrificing any of the principles of the invention.

What I claim as new and desire to secure by Letters Patent is:—

1. A heater including a casing having a plurality of heat conducting laminations, a porcelain base in the casing, heating elements in the porcelain base, spacer elements between the face and bottom of the casing, a shelf within the casing in spaced relation with the base, storage batteries supported on the legs and having electrical connection with the heating elements.

2. A heated table comprising a casing whose walls include a plurality of superimposed laminations of heat retaining material, a false bottom in the receptacle, a heating unit arranged between the bottom of the receptacle and the false bottom including an electrical resistance element to be electrically connected to a source of electrical energy, and a plurality of spacing elements arranged between the opposite faces of the heating element, receptacle bottom and false bottom, respectively.

In testimony whereof I affix my signature.

JOHN T. HARRISON.